United States Patent Office 3,432,647
Patented Mar. 11, 1969

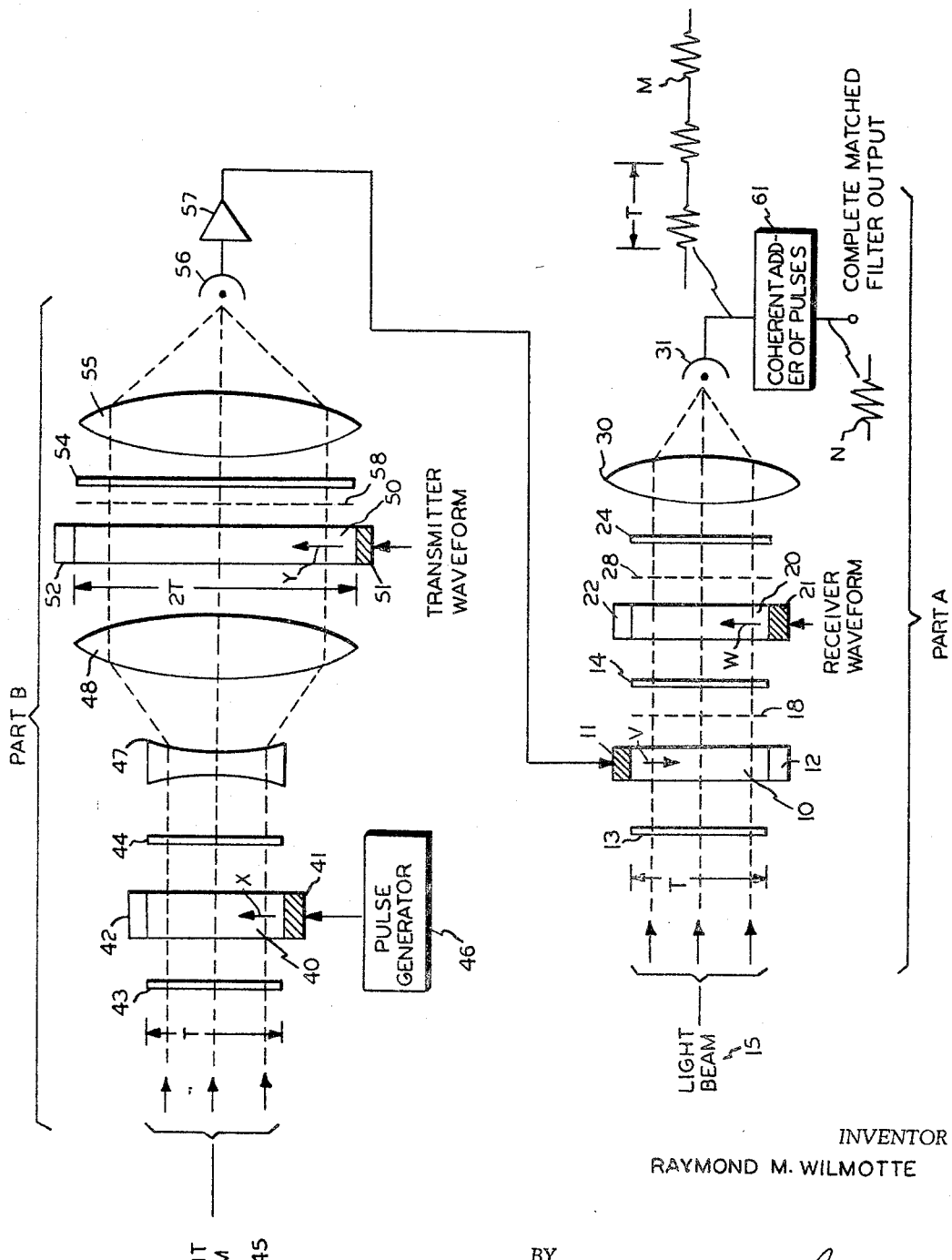

3,432,647
ELECTRO-OPTICAL CORRELATOR
Raymond M. Wilmotte, 4301 Massachusetts Ave. NW.,
Washington, D.C. 20016
Filed Dec. 13, 1963, Ser. No. 330,481
U.S. Cl. 235—181　　14 Claims
Int. Cl. G06g 7/19, 7/18; G06f 15/34

ABSTRACT OF THE DISCLOSURE

An ultrasonic, electro-optical correlator system is disclosed, of the type wherein a light beam is modulated by two signals transmitted along two delay lines. Correlation is obtained by the resultant two modulations of the light beam. One of the two signals is first reversed on its time axis before being applied to its delay line, and in this way the correlation output is obtained with reference to the entire lengths of the delay lines. A similar system is used to reverse the time axis of said one signal.

---

The present invention relates to the electro-optical correlation of signals, and particularly to the production of an output in the time domain representative of the correlation between the signals. This invention is related to the invention described in my copending patent application Ser. No. 158,928, filed Nov. 21, 1961, which application is accordingly incorporated herein by reference.

In general, in accordance with the present invention, an unknown electrical signal and a reference electrical signal are each presented in separate spatial arrays, preferably by conversion of the signals into sonic energy and transmission thereof along respective transparent sonic delay lines. By optical correlation techniques, the two signals on the two delay lines are correlated, and their optical correlation output is integrated over a period of time by means of a photoresponsive device, to convert the optical output into an electrical correlation output in the time domain. Whereas my said prior copending application is directed at least in part to the correlation between an unknown signal and a reference waveform of fixed pattern as embodied in a predetermined optical mask, the present invention provides a similar function, except in place of the fixed mask a synthetic mask is formed by the embodiment of the reference signal in a sonic delay line. The reference signal or synthetic mask may therefore be changed at will, or continuously varied if desired.

In the practice of the present invention, it is necessary to convert electrical signals into spatially arrayed respective light patterns representative or definitive of the waveforms of the signals. This is accomplished by means of a transparent sonic delay line, preferably a transparent, solid, ultra-sonic, birefractive delay line, sandwiched between a pair of crossed polarizers. By means of a suitable electro-sonic transducer, as for example a piezoelectric crystal, coupled to one end of the sonic delay line, the electric signal is converted into a sonic wave corresponding to the waveform of the applied electrical signal and is caused to travel along the delay line. A light beam is transmitted through the first polarizer, through the delay line transversely to the line of travel of the sonic waveform, and thence through the second polarizer. Because of the birefractive property of the delay line when placed under stress, the light output from the second polarizer is caused to vary over the extent of the delay line in accordance with the function embodied in the sonic signal contained in the delay line. In other words, the instantaneous distribution of the sonic signal along the delay line is indicated by the corresponding instantaneous light pattern constituting the light output from the second polarizer. And where a solid birefractive delay line is used, this light output embodies all the details of the waveform contained in the electrical signal, including the fine structure as well as the envelope of the signal. Since the complete waveform of an electrical signal may be considered as composed of the instantaneous carrier frequencies and the modulations thereof, when using a solid birefractive delay line, the light output contains the entire frequency and amplitude components of the electrical input signal.

To correlate an unknown signal with a reference signal, two delay line systems as above described are utilized in tandem relative to the light beam, so that the light output pattern of the first delay line system comprises the light input to the second system. The reference signal is applied to one delay line, and the unknown signal to the other delay line. Thus, the light output of the second system after appropriate integration embodies the degree of correlation function between the two signals. One method of integration is to focus the entire light output of the second system onto a photocell; and the output thereof is thus an electrical signal embodying the correlation function of the two input signals in the time domain.

Accordingly it is one object of the present invention to provide for the correlation of two signals, wherein the correlation output is obtained in the time domain.

Another object of the present invention is to provide for the correlation of two signals having continuously varying waveforms, wherein the correlation output is obtained in the time domain.

Another object of the present invention is to provide for the correlation of a reference signal and an unknown signal, wherein the reference signal embodies a continuously varying waveform, and wherein the correlation output is obtained in the time domain.

Another object of the present invention is to provide for the correlation of two signals, including all the frequency and amplitude components thereof, and wherein the waveform of one or both signals may be continuously variable, and wherein the correlation output is obtained in the time domain.

Still another object of the present invention is to provide a very accurate synthetic matched filter.

And still another object of the present invention is to provide a continuously varied matched filter.

Other objects and advantages of the present invention will become apparent to those skilled in the art from a consideration of the following exemplary detailed description of the invention, had in conjunction with the accompanying drawing which is a schematic illustration of one embodiment of the invention.

Referring to the drawing, the system illustrated comprises two parts, part A and part B. The correlator is embodied in part A, and it comprises an elongate, solid, transparent birefractive, ultra-sonic delay line 10, which may for example be formed of fused quartz. The ultrasonic input to line 10 is indicated at one end of the line by the electro-sonic transducer 11, which is preferably barium titanate with appropriate electrodes. An ultrasonic energy absorber 12 is provided at the opposite end of the line, so that there will be no reflections in the line as a signal travels the length of the delay line in the direction of the arrow V.

The line 10 is sandwiched between crossed polarizers 13 and 14, each oriented with their axes preferably parallel and perpendicular to the line of travel of sonic waves in the delay line for shear waves. This orientation provides maximum sensitivity for the system. A parallel or collimated beam of light 15 is provided which passes through the first polarizer 13, through the delay line 10 transversely to the line of travel of the sonic energy, and thence through the second polarizer 14. In addition, in the preferred embodiment of the present invention, a quarter-wave optical plate 18 is inserted at any convenient point between the polarizers. The purpose of the quarter-wave optical plate is to shift the origin of the stress-optical characteristics to a desired point in the sinosoidal response, as more fully explained in my said copending application. With no stress applied to the delay line 10, very little light, or a determined uniform intensity of light, passes the second polarizer 14 over its extent. When a stress is applied to line 10, or to any portion of line 10, as by the application of a sonic wave thereto through transducer 11, the light intensities emerging from the second polarizer 14 in the areas corresponding to the areas of stress in the delay line 10, vary correspondingly with the amount of stress, according to a sinosoidal law.

With the system as thus far described, it will be appreciated that upon the application of an electrical signal to the transducers 11, a corresponding sonic waveform is caused to travel down the delay line 10 in the direction of arrow V. Thus, a stress pattern is set up along the length of the delay line 10, corresponding at any instant to the waveform of that portion of the input signal then distributed in the space domain of the delay line. Accordingly, the light output passed by the second polarizer 14 at any instant, embodies an intensity pattern, distributed over its dimension corresponding to the length dimension of the delay line 10, wherein the intensity variations correspond to the stresses present in the related portions of the delay line. Hence, the light intensity variation pattern existent at any moment as the light output along the second polarizer 14, corresponds to the waveform carried over the length of the delay line at that instant.

The correlator of part A further includes a second similar ultra-sonic delay line 20, likewise having an electro-sonic transducer 21 at one end and a sonic energy absorber 22 at its other end. This delay line is arranged adjacent to and parallel with delay line 10, with the respective transducers at opposite ends, so that sonic energy in one line travels in the opposite direction from sonic energy in the other line, as indicated by arrows V and W in lines 10 and 20 respectively. Delay line 20 is sandwiched between a pair of crossed polarizers 14 and 24, in the same manner as line 10, polarizer 14 functioning both as the output polarizer for line 10 and the input polarizer for line 20. Also, a quarter wave optical plate 28 may be associated with line 20 if desired, for the same purpose as indicated above with respect to plate 18.

The output light pattern from polarizer 14 passes through the delay line 20 to polarizer 24, while an electrical signal is applied to transducer 21 to cause a sonic waveform to travel along the line 20 in the direction of arrow W. It will be apparent that if at a particular instant all or part of the sonic waveform on lines 10 and 20 are identical and are spatially coincident, the total quantity of light emergent from the polarizer 24 over the length of the delay lines will reach a maximum, and maximum correlation between the two eletcrical signals is thus indicated at this instant.

The entire light output from polarizer 24 is continuously focused by lens 30 on photocell 31 and thus integrated over a period of time corresponding to the length of the delay line. The resultant electrical output from photocell 31 is a correlation function waveform diagrammatically represented at M.

In order to obtain a correlation measurement as depicted in part A of the drawing, it will be apparent that if the unknown electrical input signal to transducer 21 is represented by a waveform $f(t)$, then the reference signal must be $f(-t)$. That is, for the segment of signal on line 20 at any instant, its leading portion must correspond to the trailing portion on line 10, and the trailing portion on line 20 must correspond with the leading portion on line 10. This time reversal of the reference signal is ac- complished in the portion of the system designated part B in the drawing.

Part B of the drawing includes a pair of preferably solid, transparent, birefractive ultrasonic delay lines 40 and 50, similar to delay lines 10 and 20. The system in which delay lines 40 and 50 are embodied is similar to the system in part A, but contains certain differences as are hereinafter explained.

Delay line 40 has at one end an electro-sonic transducer input 41, and a sonic energy absorber 42 at its opposite end. The delay line 40 is sandwiched between crossed polarizers 43 and 44, and a collimated light beam 45 is directed to pass transversely through the delay line and crossed polarizers arrangement. A second delay line is provided at 50, having an electro-sonic transducer 51 at one end and a sonic energy absorber 52 at its opposite end, and is sandwiched between crossed polarizer 44 and polarizer 54. A quarter wave optical plate 58 may be provided if desired, for the purpose explained above. Delay line 50 and its associated polarizers are arranged in tandem to delay line 40 and its polarizers relative to light beam 45, so that the light emergent from polarizer 44 constitutes the light input to delay line 50.

Delay line 40 is selected to have a working length of T, as indicated in the drawing. The input to transducer 41 is a series of sharp pulses from generator 46. The pulse repetition rate of generator 46 is selected so that when one pulse has completed its traverse along line 40 in the direction of arrow X and reaches the absorber 42, the next pulse is applied to the transducer 41. Thus the delay line distance T is also a measure of time, in that it represents the time it takes a pulse to traverse delay line 40 and the time between input pulses to line 40.

Because of the crossed polarizers 43 and 44 and the birefractive property of line 40, each pulse applied to line 40 is represented by a light spot output from polarizer 44 that travels the length T in correspondence with the sonic pulse traveling along the line 40.

Delay line 50 is chosen to have a working length of exactly 2T—i.e. twice that of line 40. The light image emergent from polarizer 44 is expanded by lens 47 and then collimated by lens 48 to cover the length 2T of delay line 50.

A reference waveform defined by $f(t)$ is applied to transducer 51 and travels along delay line 50 in the direction of arrow Y to absorber 52. It should be noted that the direction of travel of sonic energy in lines 40 and 50 is the same. However, because line 40 is exactly one half the operational length of line 50, and its light output is expanded to correspond optically with the length of line 50, the light spot output from polarizer 44 scans line 50 at exactly twice the speed of travel of the reference waveform $f(t)$ in the delay line, and therefore each input pulse to line 40 scans exactly one half the waveform present on line 50 at the start of the pulse on line 40. Further, because the sonic energy is traveling in the same direction in lines 40 and 50, the light pulse output from polarizer 44 scans the waveform on line 50 inversely in time relative to the signal $f(t)$, or as $f(-t)$.

It is seen that the delay line 40, and pulse generator combination acts to produce a slit of light on the line 50 traveling along the line at double the speed of the sonic wave in the line 50. Any other technique for moving a slit of light in this manner can be substituted for the technique described here.

The scanning light spot emergent from polarizer 44 is modulated by the sonic waveform on line 50, to provide a light output from polarizer 54 which moves along the direction of arrow Y and varies in intensity in accordance with the waveform embodied in $f(-t)$. The entire light output of polarizer 54 is focused on photocell 56 and there converted to the electrical signal of form $f(-t)$. This signal is amplified at 57 and applied as the input to transducer 11 of delay lne 10. Thus, a reference signal $f(-t)$ is provided for delay line 10, to be correlated with an unknown signal which does or may contain a waveform $f(t)$ applied to delay line 20. Delay lines 10 and 20 should of course each have a working length of T as indicated in the drawing. Under these conditions, assuming that the same waveform is applied as the input to transducer 51 of delay line 50 and to transducer 21 of delay line 20, a series of correlation outputs M are obtained in the time domain, spaced from each other by the time equivalent to T (i.e. the time it takes a pulse to travel the working length of delay line 40). If desired, these correlation waveforms M (each one of which corresponds to one half the waveform on line 50 scanned by a single pulse on line 40), can be summed in a coherent adder 61 to provide the complete matched filter output N.

By way of illustration, the present invention can be utilized to analyze radar information. For this purpose the transmitter waveform $f(t)$, which may be a repetitive complex waveform or a continuously varied random waveform is applied as the input to transducer 51 of delay line 50; while the received echo signal is applied as the input to transducer 21 of delay line 20. It is of course understood that the waveforms here referred to are not the microwave signals, but either the modulations or an IF signal thereof. Correlation of the two waveforms in delay lines 10 and 20 detects the presence of the transmitted waveform in the received signal, even if masked by a jamming signal, and the time of occurrence of correlation relative to a time reference established by the transmitted signal is a measure of the target range. The delay lines in Part A are shown to be of length T. This is the full length of the portions of the signals in the delay lines 10 and 20 which are to be correlated. If the full correlation function is to be obtained, it will therefore be necessary to synchronize the two waveforms. In the event the invention is employed in a system that does not permit this synchronization, the delay lines should be longer so that there is assurance that the waveforms will coincide over some portion of the length.

It is understood that the foregoing description of one embodiment of the present invention is presented merely for purposes of illustration to enable a complete understanding of the invention, and that various changes and modifications will become apparent to those skilled in the art. For example, the invention has been described with a particular preferred form of correlator using transparent, solid sonic delay lines. However, other methods of modulating light and other forms of delay lines may be used. Accordingly such changes and modifications as are embraced by the spirit and scope of the appended claims are contemplated as within the purview of the present invention.

What is claimed is:

1. An electro-optical correlator, comprising means for converting a selected time interval of a first varying electrical signal in the time domain to a light pattern in the space domain of different degrees of intensity definitive of the waveform of said signal and including an electrical signal input means therefor, a variable light modulating means responsive to a selected time interval of a second varying electrical signal in the time domain for establishing in the space domain a light modulating pattern corresponding to the waveform of the last mentioned signal and including an electrical signal input means therefor, said modulating means being oriented to modulate said light pattern with the time axis of said modulating pattern extending in the opposite direction from the time axis of said light pattern, and means for reversing the time axis of one of said electrical signals before being applied to its input means.

2. An electro-optical correlator as set forth in claim 1, and further including means for integrating the modulated light pattern over a period of time to obtain an output of the correlation between the first and second electrical signals.

3. An electro-optical correlator as set forth in claim 2, wherein one of said signals is representative of a transmitted radar signal and the other signal is representative of the echo signal thereof.

4. An electro-optical correlator, comprising first and second ultra-sonic transparent delay lines, each having an electro-sonic input transducer at one end, means for generating a light beam, said delay lines being oriented to cause said light beam to pass through them both in succession and in a direction transverse to the lines of travel of sonic energy therein, said delay lines being further oriented to provide opposite directions of travel of sonic energy therein from the respective transducers, means for reversing the time axis of a first electrical signal and applying it to one of said transducers, and means for applying a second electrical signal to the other of said transducers.

5. An electro-optical correlator as set forth in claim 4, and further including means for detecting the modulations of said light beam by said delay lines, and means for integrating over a period of time the modulated and detected light beam, to obtain an output of the correlation between the first and second electrical signals.

6. An electro-optical correlator as set forth in claim 5, wherein one of said electric signals is representative of a transmitted radar signal and the other of said electric signals is representative of the echo signal thereof.

7. An electro-optical correlator as set forth in claim 5, wherein said transparent delay lines are solid birefractive delay lines.

8. An electro-optical correlator as set forth in claim 7, wherein said means for reversing the time axis of the first electrical signal comprises: a pair of ultra-sonic transparent delay lines, each having an electro-sonic input transducer at one end, means for generating a light beam, said delay lines being oriented to cause said light beam to pass through them both in succession and in a direction transverse to the lines of travel of sonic energy therein, said delay lines being further oriented to provide the same direction of travel of sonic energy therein from the respective transducers, one of said pair of delay lines having a working length one half that of the other of said pair, an optical system between the two delay lines of said pair for equating their lengths optically, means for applying a succession of electrical pulses to the input transducer of the shorter delay line of said pair spaced in time at least the period required for one input pulse to travel the working length of said shorter delay line, means for applying to the input transducer of the other delay line of said pair the electrical signal whose time axis is to be reversed, and means for detecting the modulations of said light beam by said delay lines and converting the same to an electrical signal.

9. An electro-optical correlator as set forth in claim 8, and further including means for adding a plurality of successive correlation outputs from said integrating means.

10. An electro-optical system for reversing the time axis of an electrical signal, comprising a variable light modulating means responsive to a varying electrical signal for establishing in the space domain a varying light modulating pattern corresponding to the waveform of a selected time segment of the signal, means for scanning said modulating means with a light beam of substantially constant intensity in the direction from the trailing portion of the waveform to the leading portion thereof at a rate faster than the rate of change of the modulating pattern from a given selected time segment to the next succeeding selected time segment, and means for converting the modulated light output of said modulating means to a corresponding electrical signal.

11. An electro-optical system as set forth in claim 10, wherein said rate of scanning is twice as fast as said rate of change of the modulating pattern.

12. An electro-optical system for reversing the time axis of an electrical signal, comprising a pair of ultrasonic transparent delay lines, each having an electro-sonic input transducer at one end and being sandwiched between crossed polarizers, means for generating a light beam, said delay lines being oriented to cause said light beam to pass through them both in succession and in a direction transverse to the lines of travel of sonic energy therein, said delay lines being further oriented to provide the same direction of travel of sonic energy therein from the respective transducers, one of said delay lines having a working length one half that of the other, an optical system between the two delay lines for equating their lengths optically, means for applying a succession of sharp electrical pulses to the input transducer of the shorter delay line spaced in time the period required for one input pulse to travel the working length of said shorter delay line, means for applying to the input transducer of the other delay line an electrical signal whose time axis is to be reversed, and means for converting the entire light beam as emergent from the two delay lines and their polarizers to an electrical signal.

13. A method of correlating a signal $f(t)$ with another signal to obtain the correlation function in the time domain, comprising converting the signal $f(t)$ to $f(-t)$, converting the signal $f(-t)$ into a form capable of modulating a beam of light in accordance with the waveform thereof, converting said other signal into a form capable of modulating a beam of light in accordance with the waveform thereof, moving said modulating forms past each other in opposite directions while passing a beam of light successively through said two modulating forms, and integrating the resultant double modulated light beam over a period of time and converting the same to an electrical signal.

14. A method of correlating a signal $f(t)$ with another signal as set forth in claim 13, wherein one of said signals is representative of a transmitted radar signal, and the other of said signals is representative of the echo signal thereof.

References Cited

UNITED STATES PATENTS

| | | | |
|---|---|---|---|
| 2,943,315 | 6/1960 | Rosenthal | 235—181 |
| 3,088,113 | 4/1963 | Rosenthal | 235—181 X |
| 3,111,666 | 11/1963 | Wilmotte | 235—181 X |
| 3,171,126 | 2/1965 | Wiley | 346—100.7 X |
| 3,189,746 | 6/1965 | Slobodin et al. | 250—237 X |
| 3,205,495 | 9/1965 | Wilmotte | 235—181 X |

MALCOLM A. MORRISON, *Primary Examiner.*

FELIX D. GRUBER, *Assistant Examiner.*

U.S. Cl. X.R.

88—1; 235—183, 197